May 20, 1958

F. PERRUCA 2,835,134

FRICTION-DRIVE SPEED REGULATORS

Filed July 11, 1955

May 20, 1958     F. PERRUCA     2,835,134
FRICTION-DRIVE SPEED REGULATORS
Filed July 11, 1955     6 Sheets-Sheet 2
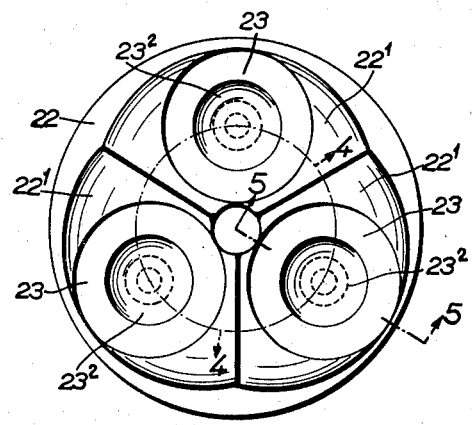
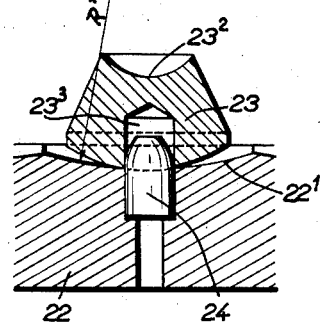
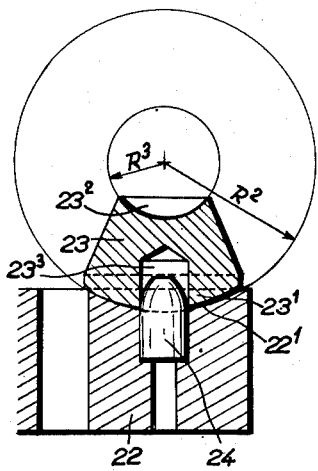

May 20, 1958 F. PERRUCA 2,835,134
FRICTION-DRIVE SPEED REGULATORS
Filed July 11, 1955 6 Sheets-Sheet 3
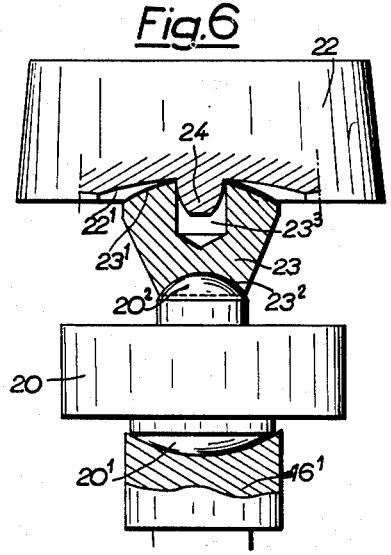
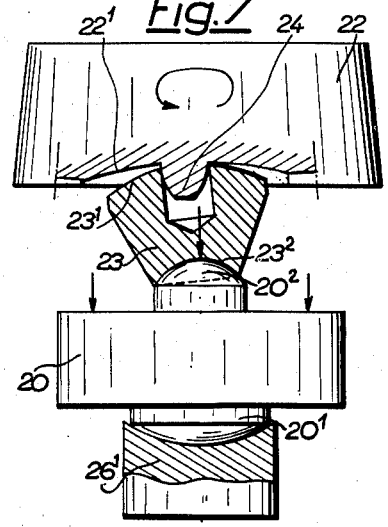
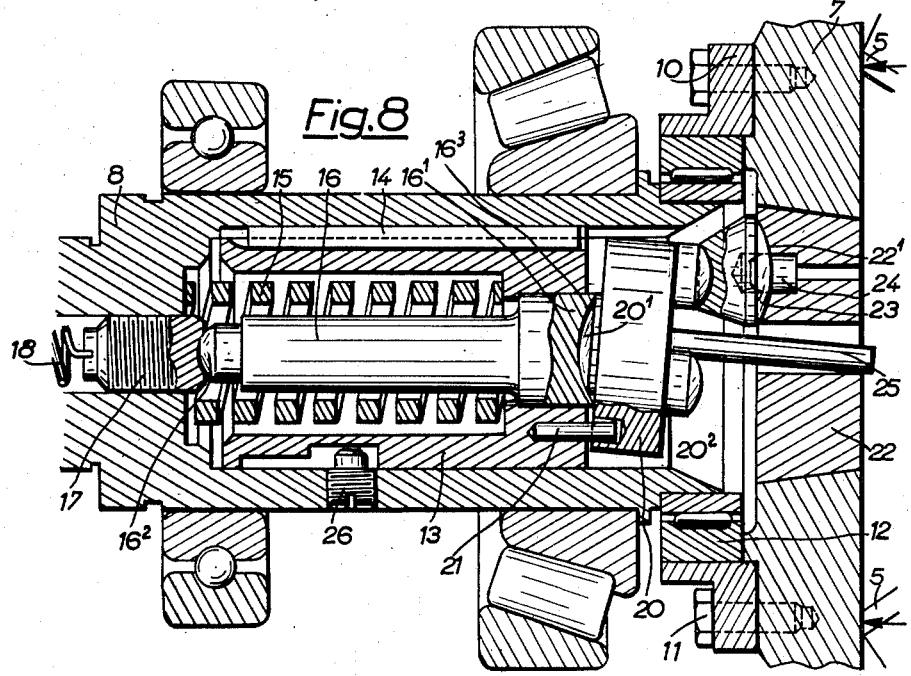

May 20, 1958 F. PERRUCA 2,835,134
FRICTION-DRIVE SPEED REGULATORS
Filed July 11, 1955 6 Sheets-Sheet 4
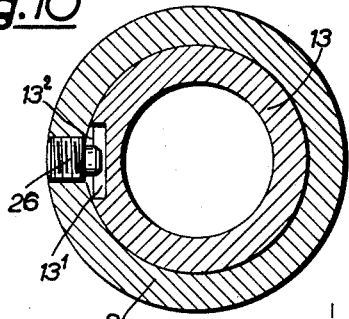
Fig.10
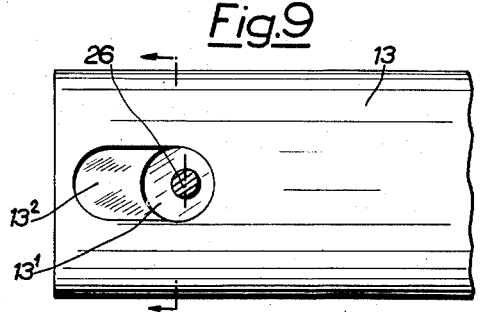
Fig.9
Fig.11
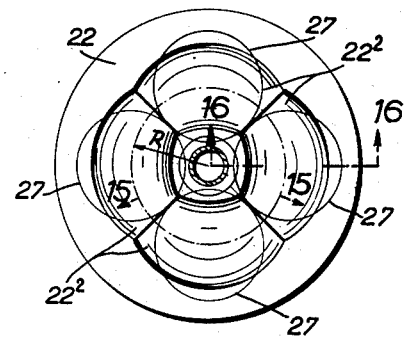
Fig.13
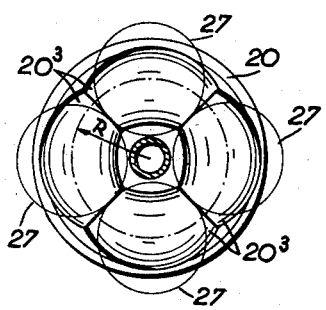
Fig.14

May 20, 1958 F. PERRUCA 2,835,134
FRICTION-DRIVE SPEED REGULATORS
Filed July 11, 1955 6 Sheets-Sheet 5

May 20, 1958 F. PERRUCA 2,835,134
FRICTION-DRIVE SPEED REGULATORS
Filed July 11, 1955 6 Sheets-Sheet 6

United States Patent Office 2,835,134
Patented May 20, 1958

2,835,134

FRICTION-DRIVE SPEED REGULATORS

Felix Perruca, Saint-Etienne, France, assignor to Societe des Fabrications Unicum, Saint-Etienne, France Application July 11, 1955, Serial No. 521,304

Claims priority, application France July 22, 1954

9 Claims. (Cl. 74—208)

This invention relates to friction drive speed regulators.

Friction drive speed regulators of the type generally illustrated in Figure 1 of the attached drawings are known. In such regulators there is a primary or driving shaft 1 which drives the axles of the driving plates 4 via a system of gears 2 and 3. Smooth rollers 5 mounted on ball bearings roll frictionally on said driving plates. The symmetrical displacement of the rollers 5 may be adjusted by a screw 6, in order to vary their position in relation to the centre of the plates 4, and consequently to vary the speed.

The rollers 5 also roll frictionally on a driven plate 7, which latter is mounted on a secondary or driven shaft 8. The shaft 8 carries, for example, a pulley 9 as is illustrated in the drawing.

In another embodiment the speed regulator can have a single driving plate 4 with a single friction roller 5.

In these friction regulators it is essential for considerable pressure to be exerted between the plates 4 and the rollers 5 for transmission without slip, as this would irreparably damage the co-operating members which latter are expensive to make. This pressure is provided by a powerful elastic means, such for example as a heavy-section coil spring. However, in order to obtain pressure, which has to be proportional to the power transmitted, it is also known to use balls interposed between connecting members, and rolling between these members in hollowed-out portions in the said members. The balls can usually only be of small diameter for reasons of space, and because of this these balls make an imprint in their hollowed-out portions when operating under heavy pressure or when the regulator is transmitting a constant power for a fairly long period.

The present invention seeks to overcome these disadvantages.

According to the present invention there is provided a friction drive speed regulator, including a primary shaft, at least one driving plate, a driving connection between the primary shaft and the driving plate, a driven shaft, a driven plate, a driving connection between the driven shaft and the driven plate, at least one rotatable roller for frictionally transmitting drive from the driving plate to the driven plate, the driving and driven plates having different axes of rotation, wherein the driven plate is slidable longitudinally of the driven shaft, and wherein the driving connection between the driven shaft and the driven plate includes a sleeve axially slidable of the driven shaft and arranged to rotate therewith, a coupling connecting the sleeve to the driven plate so that the sleeve rotates with the driven plate, means urging the sleeve longitudinally of the driven shaft to force, via the coupling, the driven plate against said roller, the coupling including means that permits, under control of the urging means, rotational displacement of the driven plate with respect to the sleeve in accordance with the power transmitted by the regulator, such rotational displacement being arranged to cause a corresponding axial displacement of the driven plate with respect to the sleeve in a direction towards the roller, and means for automatically taking up play in the working parts of the coupling.

For a better understanding of the invention and to show how the same may be carried into effect reference will now be made to the accompanying drawings in which:

Figure 1 is an overall sectional view of a friction drive speed regulator, which is illustrated by way of a non-limitative example of use of the improvements of the invention. The part of the regulator (secondary driven plate and shaft) affected by these improvements is illustrated in heavier lines, Figure 2 is an axial section through the secondary driven plate and shaft constructed with the improvements of the invention, on a larger scale, Figure 3 is an end view of part of the regulator showing a connecting member with hollowed-out portions, fast with the driven plate, and spherical driving sectors, Figure 4 is a part section, in the axial and longitudinal direction, of a hollowed-out portion taken along the line 4—4 of Figure 3, Figure 5 is a part section, in the transverse sense of a hollowed-out portion, along the line 5—5 of Figure 3, Figure 6 is a part section showing a part of the regulator in a position with the regulator at rest, or with the regulator operating at reduced power, Figure 7 is a part section of a part of the regulator illustrating the regulator operating at increased power, Figure 8 is a sectional view to a different scale, of the part of Figure 2 in a position in which the elements are slightly displaced with respect to each other.

Figures 9, 10 and 11 illustrate to a larger scale and by corresponding views a further part of the regulator.

Figure 13 is a view taken along the line 13—13 of Figure 12 to a larger scale. The thin line traces in the figure illustrate intermediate driving balls in a position when the regulator is at rest or during transmission of reduced power.

Figure 14 is a view taken along the line 14—14 of Figure 12 under the same conditions as in Figure 12.

Figure 1:
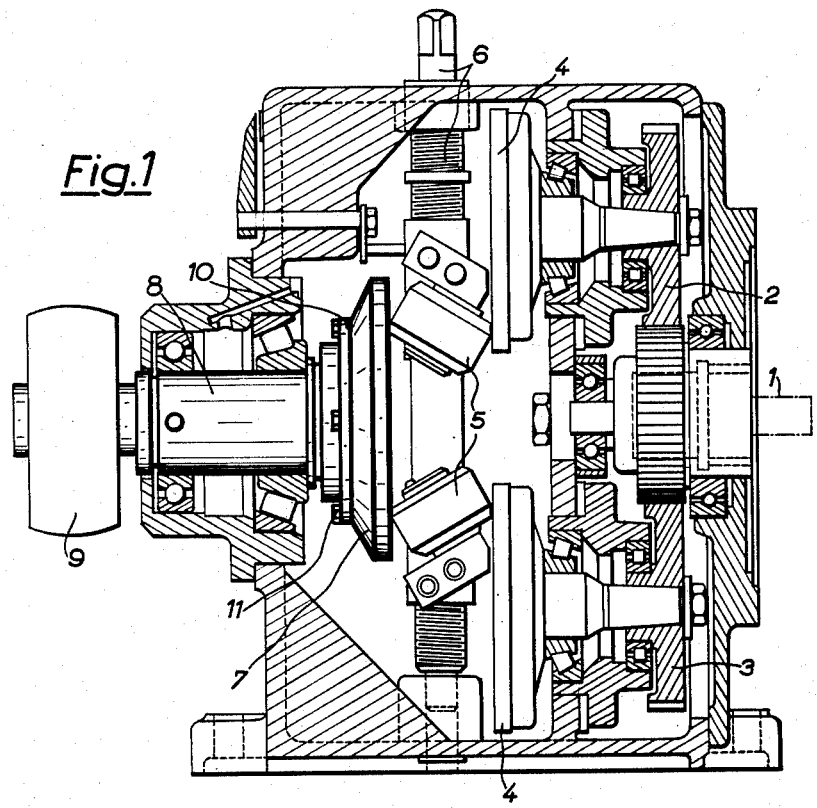
Figure 2:
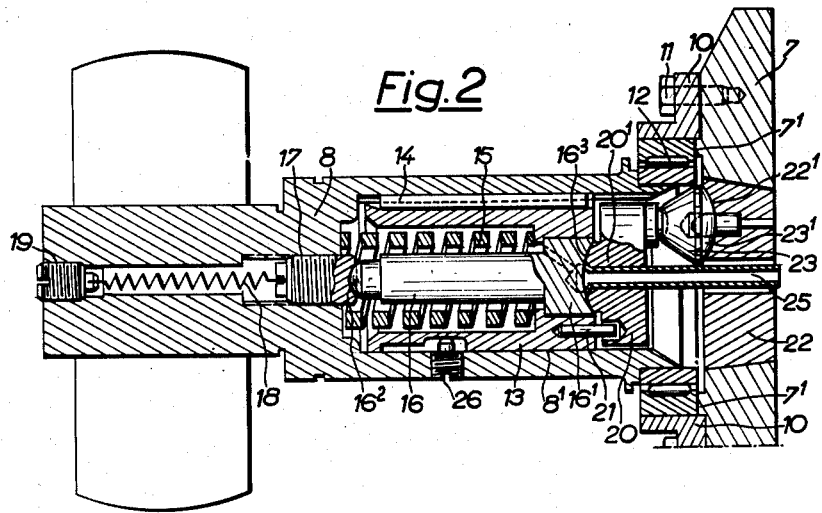

Referring to Figures 1 and 2, the driven plate 7 is directly centred and is carried by the secondary driven shaft 8. For this purpose, the plate 7 has a small centring bearing surface $7^1$ in a rim 10 to which it is fixed by screws 11 or other means. The rim 10 is fitted on a needle bearing 12 which is itself fitted on a bearing surface at the end of the secondary shaft 8. A needle bearing is preferably used in order to provide a better support for the plate 7 and also to eliminate any friction likely to brake the displacement of the spherical sectors in their hollowed-out portions, as is apparent from the rest of the description. The plate 7 and the secondary shaft 8 rotate together at substantially the same speed.

The secondary shaft 8 is bored at $8^1$ over part of its length, and a sleeve 13 is slidably fitted in this bore, the secondary shaft being fast in rotation with said sleeve by way of one or more keys 14. A coil spring 15 of heavy square section is fitted in the sleeve, the spring being in compression, and exerting pressure between the base of the bore $8^1$ on the one hand and the base of the bore in the sleeve 13 on the other hand.

An abutment 16 whereof the head $16^1$ is slidably fitted in a corresponding bearing surface in the sleeve 13 is disposed on the axis of the shaft 8 and the sleeve 13. The head $16^1$ bears against the base of the bearing surface in the sleeve, in such a way that the abutment 16 is subjected to the pressure of the spring 15 via the sleeve 13.

A spherical convex domed portion $16^2$ is provided at one end of the abutment 16, and bears against and into a hollowed-out portion of the same shape provided in the end of a screw 17. This latter forms part of a device for automatically taking up play, this device consisting essentially of a coil spring 18 accommodated on the axis of the shaft 8. One end of the spring 18 is attached to a screw 19, allowing circular tension to be imparted thereto, and the other end of the said spring is attached to the screw 17, which it can drive and push forward together with the abutment 16 whenever this is possible, when there is play in the assembly.

The head $16^1$ of the abutment 16 has a hollowed-out portion $16^3$ in the form of a spherical domed portion wherein pressure is exerted by the rear boss $20^1$ of a connecting member 20. Driving lugs 21 carried by the sleeve 13 project into holes in the member 20 in order to make the two members rotationally fast.

As regards the abutment 16 and the function hereinbefore described which is allotted to it, it should be noted, in the assembly described above that this abutment allows the pressure of the system 17—18—19 for automatically taking up play to be transmitted directly to the members of the driving device, and allows proportional pressure between the plate 7 and the shaft 8. This direct transmission of pressure improves the effectiveness with which play is taken up, which can result chiefly from weakening of the spring 15.

Drive with proportional pressure between the plate 7 and the shaft 8 is provided by the aforementioned connecting member 20, which is fast with a sleeve 13 and the shaft 8, and with a connecting member 22, which is fast to the plate 70 by a conical adjustment and jamming.

Between these connecting members are disposed driving members constructed in the form of spherical sectors 23, which have on the one hand a wide spherical convex domed portion $23^1$ intended to press into the hollowed-out portions $22^1$ executed in a special manner in accordance with three radii in the member 22.

The hollowed-out portions $22^1$ are in fact formed (1) in accordance with a circular axis of radius R (Figure 3); (2) with a curve or slope of radius $R^1$ in the longitudinal direction of the hollowed-out portions (Figure 4) and finally; (3) with a concavity of radius $R^2$ in the transverse direction (Figure 5).

The spherical domed portion $23^1$ of the driving sectors 23 is of the same radius $R^2$, which is the transverse radius of the hollowed-out portions $22^1$ (Figure 5). Furthermore, the sectors 23 have a concavity $23^2$ in the form of a spherical domed portion of radius $R^3$, intended to bear against the bosses $20^2$ of corresponding convex form.

The radii $R^2$ and $R^3$ of the domed portions $23^1$ and $23^2$ have the same centre. The driving sectors 23 are accurately and circularly positioned by the fingers 24 fixed by force fit or in any other manner in the middle axial part of the hollowed-out portions $22^1$. These fingers project into holes $23^3$ pierced in the axis of the sectors 23, from the domed portions $23^1$ to a sufficient depth.

In order not to hinder rolling of the sectors 23 in the hollowed-out portions $22^1$, the emerging part of the fingers 24 which projects into the holes $23^3$ has a curvilinear profile in development of a circle, in such a way as always to retain contact inside the hole $23^3$, and to fix the position of the sectors 23 without upsetting their rolling (Figure 7).

The operation of the driving system consisting of the members 20—22 and 23 is illustrated by Figures 6 and 7, and in particular by Figure 7, where it can be seen that slight relative rotation of the member 22 with respect to the member 20 has the effect of driving the sectors 23 which roll on the slopes $22^1$ of radius $R^1$, and when the transmission member 20 is pushed back in accordance with the arrows the spring 15 is compressed, and the reaction increases the pressure between the plates and rollers in proportion to the power transmitted.

It will be observed in this arrangement that there is a large bearing surface on the domed portions $23^1$ and $23^2$, which practically prevents the formation of imprints on the bearing surfaces. The domed portions $23^1$ provides the advantage, with the small space requirement of the spherical sectors 23, of the use of a sphere of large diameter $R^2$ (Figure 5).

The member 20 is placed under pressure by the spherical convex domed portions $20^1$ and $20^2$, between the abutment 16 and the driving sectors 23 respectively. This mounting allows the member 20 to have a certain play in relation to the plane of the plate 7, and to the sleeve 13. This play is illustrated with appropriate magnification in Figure 8. As a result, on the one hand the member 20 can take up slight differences in dimensions of the bosses $20^2$ or of the sectors 23, which implies less expensive accuracy in the manufacture of these members, and on the other hand if rotation of the plate is not perfectly even because of play in the rollers or for any other reason, vibration is not transmitted to the shaft 8 and to the internal members.

A lubricating tube 25 is fitted on the axis of the member 20, to which it is fixed by slight crimping. This tube traverses the connecting member 22 in such a way that during operation oil is projected into the said tube, and this oil passes through a hole pierced in the head $16^1$ into the interior of the sleeve by centrifuging in order to lubricate the various members.

Figure 12:
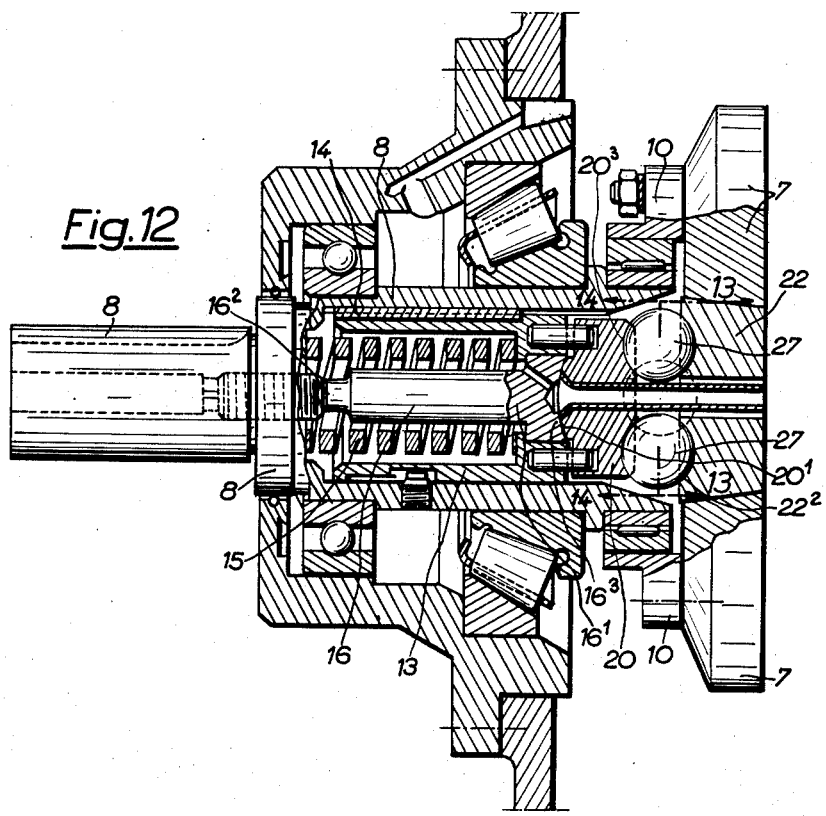
Figure 12 is an axial section of a second embodiment of a regulator.

Assembly of the regulator, and in particular of the members subjected to the pressure of the spring 15, is facilitated by the arrangement according to which a screw 26 is screwed into the shaft 8, the end of this screw engaging in a milled hole $13^1$ in the sleeve 13 (Figures 10, 11 and 12). The hole $13^1$ can thus retain the sleeve 13 and the taut spring 15 during fitting of the plate 7 and the various members. It should be understood that the hole $13^1$ is of sufficient dimensions not subsequently to hinder displacements of small amplitude of the sleeve 13 in the axial direction.

Furthermore, the hole $13^1$ is extended by a milled portion $13^2$ of smaller height, which provides safety in the case of dismantling.

Referring to Figure 12 in which parts referred to in connection with Figures 1 to 11 have been given the same reference numerals, driving members consisting of several balls 27 are interposed between the members 20 and 22. There can be at least three balls, there being four balls shown in the drawings.

Figure 19:
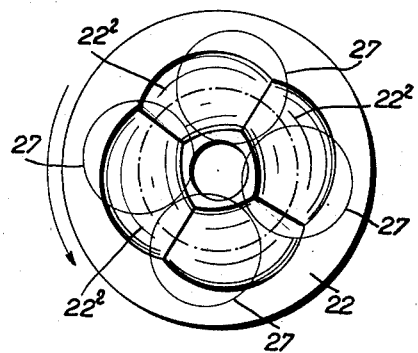
Figure 19 is a view taken along the line 19—19 of the Figure 18.

As shown by thin lines in Figures 13, 14 and 19 the balls are disposed in a circular axis in such a way as to be substantially adjacent to each other, there being a small distance between the balls in order that they can be displaced freely and without jamming.

Figure 15:
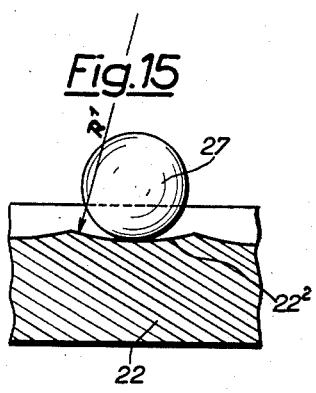
Figure 15 is a section in a sector of a circle on the circular axis of the hollowed-out portions of a connecting member taken along the line 15—15 of Figure 13.
Figure 16:
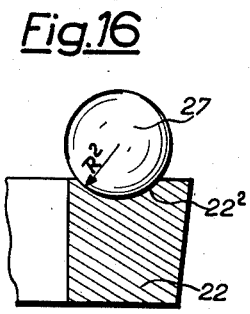
Figure 16 is a part section on the diametrical axis of a hollowed-out portion taken along the line 16—16 of Figure 13.

The connecting members 20 and 22 have hollowed-out portions $20^3$ and $22^2$ (Figures 17 and 18) corresponding in number to the number of balls 27. Each hollowed-out portion is formed in accordance with three radii, i. e., (1) in accordance with a circular axis of radius R (Figures 13 and 14); (2) in accordance with a curve or slope of radius $R^1$ (Figure 15) in the longitudinal direction of the hollowed-out portions, and finally; (3) with a concavity of radius $R^2$ in the transverse direction of the hollowed-out portions (Figure 16): the radius $R^2$ is the same as the radius of the balls 27.

It is important for these characteristics to be carefully observed, especially the formation of the hollowed-out portions on a circular axis of radius R, so that the balls 27 are displaced in a concentric manner, without any spiral deviation, which would lead to jamming of the balls.

In these circumstances, having regard to the position of the balls, which, as has been indicated, are substantially adjacent, the balls 27 provide between them reciprocal automatic guiding when they are displaced by exactly the same amount in their hollowed-out portions on the axis of radius R, without the need to use guide rings and other things to complicate assembly.

Figure 17:
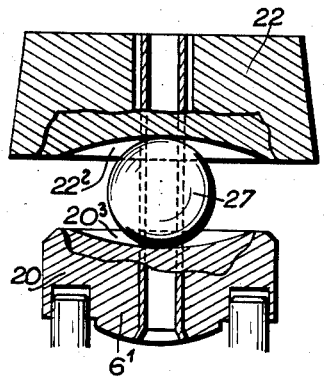
Figure 17 illustrates a part of the regulator of Figure 12 in the position when it is at rest, or corresponding to transmission of reduced power.
Figure 18:
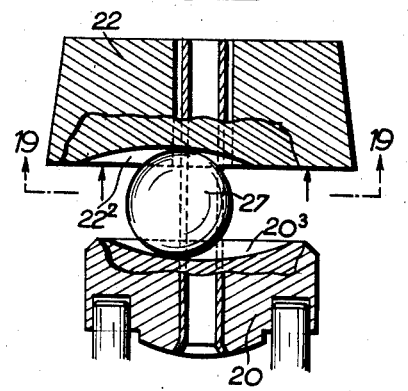
Figure 18 illustrates a part of the regulator of Figure 12 in the position corresponding to greater transmission of power.

Figures 17 and 18 illustrate the operation of the automatic axial pressure device considered in the members 20 and 22, and the balls 27. It is apparent in Figure 18 that slight relative rotation of the member 22 with respect to the member 20, drives the balls 27, which roll on the slopes of radius $R^1$ in the hollowed-out portions $20^3$ and $22^2$, pushing back the member 22 in accordance with the arrows. In consequence, the pressure between the plates and the driving rollers is increased in proportion to the power transmitted.

I claim:

1. A friction drive speed regulator, comprising a primary shaft, at least one driving plate, a driving connection between the primary shaft and the driving plate, a driven shaft, a driven plate having a different axis of rotation to that of the driving plate and slidably mounted on the periphery of the driven shaft, at least one friction drive transmitting roller located between and frictionally engaging the driving plate and the driven plate, a sleeve axially slidable on the driven shaft and constrained to rotate therewith, means urging the sleeve longitudinally of the driven shaft towards the roller, a coupling plate associated to the driven plate and connected to the sleeve to rotate therewith, a plurality of driving members associated with the driven and coupling plates for transmitting drive from the driven plate to the coupling plate and disposed around the axis of the driven shaft, a convex spherical surfaced portion on each driving member, there being a hollowed-out seating portion, one for each driving member, in one of the associated plates, the seating portion having a greater radius than that of the spherical surfaced portion in a direction transverse to the radius from the axis of rotation of said one plate, there being a concave spherical surfaced portion in each driving member and opposite to the convex portion thereof, and complementary seatings formed in the other of the associated plates, and co-operating one with each of the concave surfaced portions.

2. A regulator as claimed in claim 1, wherein a recess is provided in each convex spherical surfaced portion, and wherein spigots are provided on said one plate and entered one in each recess, each spigot including profiled surface portions permitting the associated driving member to rock relative to said one plate.

3. A friction drive speed regulator, comprising a primary shaft, at least one driving plate, a driving connection between the primary shaft and the driving plate, a driven shaft, a driven plate having a different axis of rotation to that of the driving plate and slidably mounted on the periphery of the driven shaft, at least one friction drive transmitting roller located between and frictionally engaging the driving plate and the driven plate, a sleeve axially slidable on the driven shaft and constrained to rotate therewith, means urging the sleeve longitudinally of the driven shaft towards the roller, a coupling plate associated to the driven plate and connected to the sleeve to rotate therewith, a plurality of mutually contacting spherical balls associated with the driven and coupling plates for transmitting drive from the driven plate to the coupling plate and disposed around and adjacent the axis of the driven shaft, and there being a hollowed-out seating portion for each ball in each one of the associated plates, each seating portion having a greater radius than that of the associated ball in a direction transverse to the radius from the axis of rotation of the plate.

4. A regulator as claimed in claim 1, and further comprising a rod located in the sleeve, a shoulder on the rod and against which shoulder the sleeve is urged by the urging means, a seating surface on one end of the rod, and a complementary seating surface on the coupling plate.

5. A friction drive speed regulator, comprising a primary shaft, at least one driving plate, a driving connection between the primary shaft and the driving plate, a driven shaft, a driven plate having a different axis of rotation to that of the driving plate and slidably mounted in the driven shaft, at least one friction drive transmitting roller located between and frictionally engaging the driving plate and the driven plate, a sleeve axially slidable on the driven shaft and constrained to rotate therewith, a coupling plate associated to the driven plate and connected to the sleeve to rotate therewith, a plurality of driving members associated with the driven and coupling plates for transmitting drive from the driven plate to the coupling plate and disposed around the axis of the driven shaft, a convex spherical portion formed on each driving member, there being a hollowed-out seating portion, one for each driving member, in one of the associated plates, the seating portion having a greater radius than that of the spherical surfaced portion in a direction transverse to the radius from the axis of rotation of said one plate, there being a concave spherical surfaced portion in each driving member and opposite the convex portion thereof, complementary seatings on the other of the associated plates and co-operating one with each of the concave surfaced portions, a rod located in the sleeve, a shoulder on the rod, means urging the sleeve longitudinally of the driven shaft towards said roller whereby the sleeve abuts against the shoulder, a seating surface on one end of the rod, a complementary seating surface on the coupling plate, and means engaging the other end of the rod to take up play between the rod, the coupling plate, the driving members, and the driven plate.

6. A friction drive speed regulator, comprising a primary shaft, at least one driving plate, a driving connection between the primary shaft and the driving plate, a driven shaft, a driven plate having a different axis of rotation to that of the driving plate and slidably mounted in the driven shaft, at least one friction drive transmitting roller located between and frictionally engaging the driving plate and the driven plate, a sleeve axially slidable of the driven shaft and constrained to rotate therewith, a coupling plate associated with the driven plate and connected to the sleeve to rotate therewith, a plurality of driving members associated with the driven and coupling plates for transmitting drive from the driven plate to the coupling plates and disposed around the axis of the driven shaft, a convex spherical portion formed on each driving member, there being a hollowed-out seating portion, one for each driving member, in one of the associated plates, the seating portion having a greater radius than that of the spherical surfaced portion in a direction transverse to the radius from the axis of rotation of said one plate, there being a concave spherical surfaced portion formed in each driving member and opposite the convex portion thereof, complementary seatings formed on the other of the associated plates and co-operating one with each of the concave surfaced portions, a rod located in the sleeve, a shoulder on the rod, means for urging the sleeve longitudinally of the driven shaft towards said roller whereby the sleeve abuts against the shoulder, a seating surface on one end of the rod, a complementary seating surface on the coupling plate, a screw in threaded engagement with the driven shaft, aligned with the axis of the rod, and abutting against the other end of the rod, and a torsion spring connected to the screw to rotate the latter in the direction that causes the screw to abut against the rod.

7. In a friction drive speed regulator of the type comprising a primary or drive shaft, at least one driving plate driven by the drive shaft, a driven plate having an axis of rotation different from that of the driving plate, at least one friction drive transmitting roller located between and frictionally engaging the driving and driven plates, and a driven shaft: means supporting the driven plate peripherally of the driven shaft at a point of maximum diameter thereof, means located centrally of the driven shaft and establishing a coupling connection between the driven plate and driven shaft automatically adjustable in response to transmitted torque.

8. In a friction drive as in claim 7, a sleeve slidable axially inside but rotatable with the driven shaft, means urging the sleeve towards the driven plate and friction roller, and means positioned between the sleeve and driven plate defining complementary spherical surfaces of large diameter relatively to the driven shaft diameter.

9. In a friction drive as in claim 8, means releasably locking the sleeve in the driven shaft against sliding movement.

References Cited in the file of this patent

UNITED STATES PATENTS

| | | |
|---|---|---|
| 1,738,965 | Reina | Dec. 10, 1929 |
| 2,132,801 | Perruca | Oct. 11, 1938 |
| 2,218,651 | Lenney | Oct. 22, 1940 |
| 2,325,502 | Georges | July 27, 1943 |

FOREIGN PATENTS

| | | |
|---|---|---|
| 461,305 | Canada | Nov. 22, 1949 |
| 891,857 | France | Dec. 18, 1943 |
| 271,469 | Switzerland | Oct. 31, 1950 |